United States Patent [19]

Hughes

[11] Patent Number: 5,122,801
[45] Date of Patent: Jun. 16, 1992

[54] MONITORING SYSTEMS

[75] Inventor: Timothy J. Hughes, Cardiff, Wales

[73] Assignee: Smiths Industries Public Limited Co., London, England

[21] Appl. No.: 563,692

[22] Filed: Aug. 7, 1990

[30] Foreign Application Priority Data

Aug. 23, 1989 [GB] United Kingdom ............... 8919151

[51] Int. Cl.$^5$ .............................................. H04K 3/00
[52] U.S. Cl. ....................................... 342/13; 342/20; 342/59; 342/53
[58] Field of Search ............. 342/13, 14, 15, 16, 342/17, 20, 52, 53, 54, 55, 59

[56] References Cited

U.S. PATENT DOCUMENTS

| | | | |
|---|---|---|---|
| H513 | 8/1988 | Dunne et al. | 342/14 X |
| 3,924,232 | 12/1975 | Burdi et al. | 342/54 |
| 4,122,521 | 10/1978 | Rick et al. | 364/424 |
| 4,139,848 | 2/1979 | Maxwell, Jr. | 342/30 |
| 4,319,242 | 3/1982 | Lewis | 342/67 |
| 4,347,513 | 8/1982 | Schindler | 342/14 |
| 4,369,445 | 1/1983 | Evans et al. | 342/17 |
| 4,403,220 | 9/1983 | Donovan | 342/29 |
| 4,433,333 | 2/1984 | Manoogian et al. | 342/14 |
| 4,700,191 | 10/1987 | Manor | 342/13 |
| 4,743,904 | 5/1988 | Morton et al. | 342/14 |
| 4,780,719 | 10/1988 | Frei et al. | 342/53 |
| 4,823,139 | 4/1989 | Eisner et al. | 342/15 |
| 4,851,854 | 7/1989 | Drogin | 342/417 |
| 4,876,545 | 10/1989 | Carlson et al. | 342/14 |
| 4,891,647 | 1/1990 | Auvray | 342/16 |
| 4,891,648 | 1/1990 | Jehle | 342/20 |
| 4,905,292 | 2/1990 | Wentworth et al. | 382/1 |
| 4,906,999 | 3/1990 | Harrah et al. | 342/20 |
| 4,935,743 | 6/1990 | Guilhem et al. | 342/17 |
| 4,975,705 | 12/1990 | Gellekink | 3432/52 |
| 4,990,919 | 2/1991 | Manoogian | 342/13 |
| 4,990,920 | 2/1991 | Sanders, Jr. | 342/14 |

Primary Examiner—John B. Sotomayor
Attorney, Agent, or Firm—Pollock, Vande Sande & Priddy

[57] ABSTRACT

An aircraft threat monitoring system has several sensors responsive to a potential threat external to the aircraft such as a radar warning receiver, a radar sensor, a missile approach warning receiver, a forward-looking infrared detector and an electro-optic sensor. Each sensor has a respective inference processor the outputs of which are supplied to a groundspace map manager and an airspace map manager. The map managers collate the processor outputs to derive a threat output signal which is supplied to a planner programmed with tactical route information. The map managers also control operation of the sensors such as by modifying their sensitivity, scan or frequency in accordance with the output from other sensors.

13 Claims, 1 Drawing Sheet

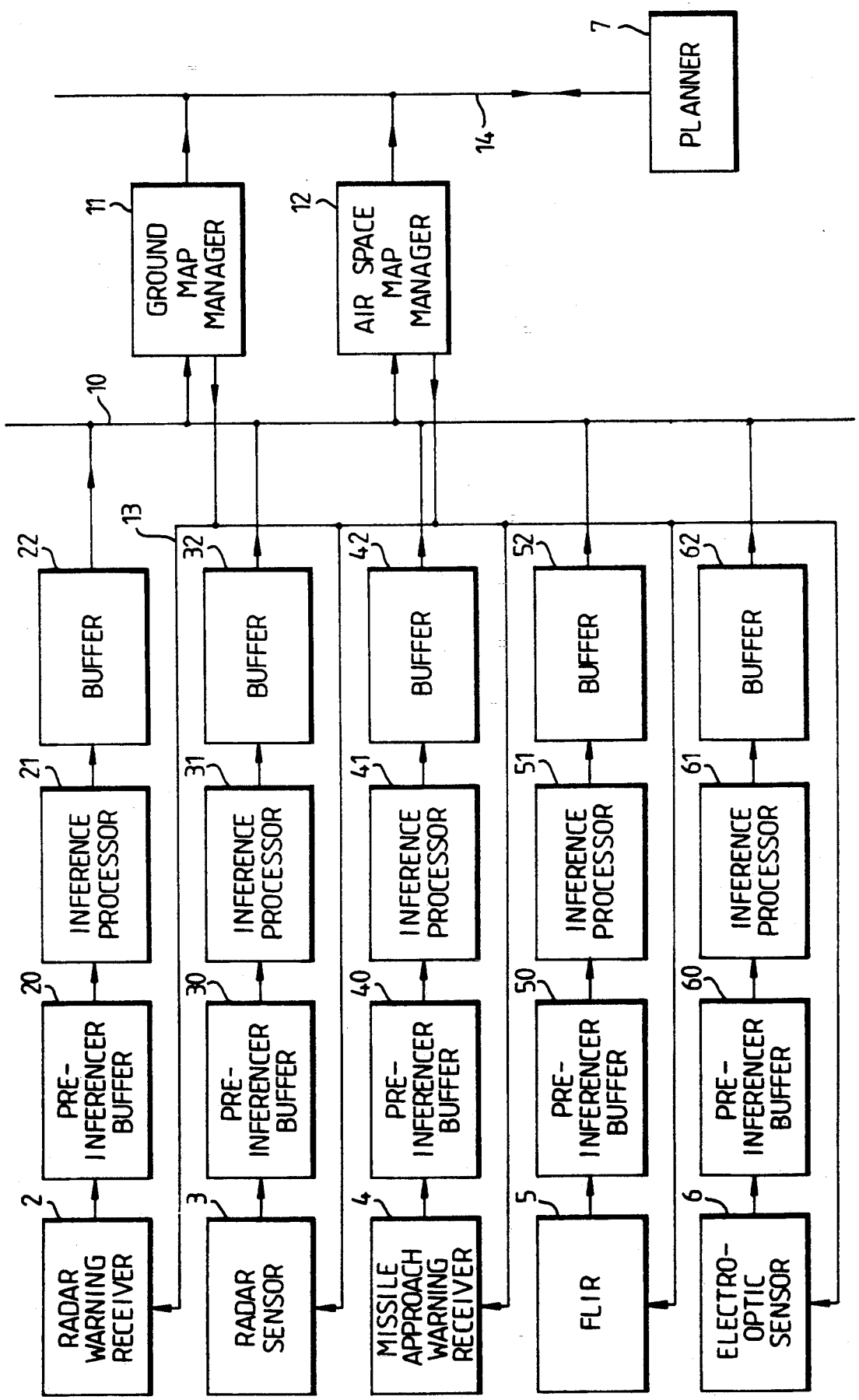

MONITORING SYSTEMS

BACKGROUND OF THE INVENTION

This invention relates to monitoring systems.

The invention is more particularly concerned with systems for monitoring threats to an aircraft such as from ground obstructions or hostile forces.

Aircraft often carry sensors to warn of threats or potential threats to the aircraft. These sensors may, for example, include radar warning receivers, missile approach warning receivers or the like. The problem with such sensors is that their number makes it difficult for the pilot to read and interpret the information they provide, especially in circumstances where he is subjected to a high work load. It is also often necessary to control operation of one sensor in accordance with information received from others of the sensors which places an additional burden on the pilot.

BRIEF SUMMARY OF THE INVENTION

It is an object of the present invention to provide a monitoring system that can be used to alleviate the difficulties of using multiple sensors.

According to one aspect of the present invention there is provided an aircraft threat monitoring system including a plurality of sensor units, each sensor unit having sensor means of a different nature responsive to a potential threat external to the aircraft and processing means arranged to receive an output of the respective sensor means to derive a respective inference output signal representative of the nature and or alternatively the location of a potential threat, the system including map manager means arranged to receive each said inference output signal, said map manager means being arranged to collate said inference output signals to derive a threat output signal, and said map manager means being arranged to control operation of at least one of said sensor means.

In this way, it is possible to optimize the performance of the sensors for different circumstances without placing an additional work load on the pilot.

One of the sensor units may include a radar sensor of a kind arranged to detect the presence and location of an object by reflection from the object of radar signals generated by the radar sensor. The map manager means may be arranged to control operation of the radar sensor to modify its sensitivity in accordance with the output from one of the other sensor units. The map manager means may be arranged to control operation of the radar sensor to modify its scan in accordance with the output from one of the other sensor units. One of the sensor units may include a missile approach warning receiver. The map manager means may be arranged to change the frequency of the radar sensor in response to detection of a missile in order to reduce the ability of the missile to home on the aircraft. One of the sensor units may include an electro-optic sensor responsive to electromagnetic radiation incident on the aircraft, the map manager means being arranged to control the frequency of radiation monitored by the electro-optic sensor. One of the sensor units may include a radar warning receiver responsive to radar emission external of the aircraft. One of the sensor units may include a forward-looking infrared detector arranged to provide infrared image information in respect of ground in front of the aircraft.

The system preferably includes first and second map manager means, the first map manager means being arranged to run a map management process in respect of the groundspace, and the second map manager means being arranged to run a map management process in respect of the airspace. One at least of the inference output signals may be supplied to both the first and second map manager means.

The system may include planner means, the planner means including route information of the aircraft from take-off to destination and the map manager means being arranged to supply information to the planner means. The planner means may include information as to the allocation of aircraft weapons.

A monitoring system for a military aircraft in accordance with the present invention, will now be described, by way of example, with reference to the accompanying drawing.

BRIEF DESCRIPTION OF THE DRAWING

The drawing shows the system schematically.

DETAILED DESCRIPTION OF THE PREFERRED EMBODIMENT

The monitoring system is installed in an aircraft and includes several different sensors 2 to 6 the outputs of which are processed to provide information to a planner unit 7 that advises the pilot about aircraft control or effects automatic control of the aircraft.

Various different sensors may be used but, in the present embodiment, the sensors are as follows: a radar warning receiver 2 that detects radar emission external of the aircraft; a radar sensor 3 that detects the presence and location of external objects by radar reflections from the object; a missile approach warning receiver 4 that detects when a fast moving object such as a missile is approaching the aircraft (this sensor may incorporate an infra-red detector); a forward-looking infrared detector (FLIR) 5 which provides infrared image information in respect of the ground in front of the aircraft and may include a thermal cueing unit responsive to a localized high level infrared signal indicative of, for example, a missile launch; and an electro-optic sensor 6 which responds to electromagnetic radiation or laser rangefinder/designator energy incident on the aircraft which may indicate hostile activity.

The output of each sensor 2 to 6 is supplied via a respective pre-inferencer buffer 20 to 60 to a respective inference processor 21 to 61. The outputs of the processors 21 to 61 are supplied via respective buffers 22 to 62 to a common bus 10.

The system also includes two map manager units 11 and 12 which are connected to the bus 10 and which run a map management process for the groundspace and airspace respectively, as explained in more detail layer. Some of the sensors, such as the FLIR sensor 5 only respond to information relating to the ground or objects on the ground and may, therefore, be arranged such that their output signals are supplied via the bus 10 only to the ground map manager 11. Other sensor information, such as from the MAW sensor 4, would only be supplied to the air space map manager 12. Some sensors, such as the radar warning receiver 2, provide information for supply to both map managers 11 and 12. The groundspace map manager 11 and airspace map manager 12 both supply control signals via a sensor control bus 13 to the sensors 2 to 6. Sensor control signals are shown as being supplied to each of the sensors 2 to 6 although some sensors may not require any control.

These controls signals instruct a particular sensor to switch operating mode, for example, from low-powered magnification to high-powered magnification.

The outputs from the two map managers 11 and 12 are supplied via a bus 14 to the planner unit 7.

In operation, each of the sensors 2 to 6 supplies output signals to its respective buffer 20 to 60. When the respective inference processor 21 to 61 is idle, that is, waiting for data to process, it attempts to take the report at the front of the buffer (queue). If the buffer is empty, the processor waits for the respective sensor to send a report. The processors 21 to 61 operate to infer hypotheses about the true identity and or alternatively the location of potential threats and emitters (such as enemy radar) based on the reports issued by its respective sensor. This inferencing is required because the data provided by the sensors may be incomplete, uncertain, inaccurate and ambiguous. The inferencing process may be performed by conventional processing techniques such as described, for example, by Dempster, A. P., J. of Royal Statistical Society, Series B, Vol 30, pp 205-247; Shafer, G., A Mathematical Theory of Evidence, Princeton University Press, 1976; Lowrance, J. D., and Garvey, T. D., Evidential Reasoning: An Approach To The Stimulation of a Weapons Operation Centre, Technical Report SRI Project 4268, AI Center, SRI International, Menlo Park, Ca., September 1983; Wesley, L. P., Reasoning about Control: An Evidential Approach, Technical Note 324, AI Center, SRI International, Menlo Park, Ca., July 1984; Wesley, L. P., Evidential Knowledge-Based Computer Vision, Optical Engineering, Vol 25, No 3, pp 363-379, March 1989; and Lowrance, J. D., Automating Argument Construction, Technical Note 416, AI Center, SRI International, Menlo Park, Ca., November 1986. These later processing techniques involve an extension of the Dempster-Shafer Theory.

The sensor information, inferencing, is supplied to both map managers 11 and 12. The map managers 11 and 12 operate to provide structure for the sensor information about the external world. The data structure accessed through map coordinates, such as longitude and latitude, is representative of two-dimensional position, the map managers being responsible for placing information into this structure and for retrieving it. Information about the ground and objects on the ground are handled by the groundspace map manager 11 whereas information about aircraft and missiles in the air are handled by the airspace map manager 12.

The map managers 11 and 12 are also capable of controlling operation of the sensors 2 to 6 in accordance with the information received by the map managers from all the sensors. For example, if a threat is detected by the electro-optic sensor 6 but not by the radar sensor 3, this could be used to control the radar sensor to increase its sensitivity or modify its scan region or range so that information about this threat was also available from the radar sensor. Alternatively, detection of a missile by the sensor 4 could be used by the map managers 11 and 12 to control the radar sensor 3 to change its frequency of operation in order to reduce the ability of the missile to home on the aircraft. Detection of a threat by some of the sensors 2 to 5 could be used to control the electro-optic sensor 6 to change the frequency of radiation being monitored to a band known to be used by a thread of the kind detected by the sensors 2 to 5.

The planner 7 is preprogrammed at the start of the mission with information concerning the known terrain, threats and any target. The planner 7 includes a tactical route from take-off to the destination, such as a target, which may take into account such factors as minimum risk to the aircraft, minimum risk of detection, maximum chance of mission success, fuel economy, avoidance of dangerous ground terrain or the like. The planner may also include information regarding the best allocation of the aircraft weapons at various points on the route to deal with threats at those points and the best use of countermeasures such as the deployment of chaff, radar decoys or flares. The information supplied to the planner 7 on bus 14 during flight gives the planner the best current information regarding what objects exist in the external world to enable it to bring up to date its information and provide the best advice to the pilot, or the best automatic control of the aircraft.

By using a separate inference processor 21 to 61 for each sensor, and a separate groundspace and airspace map manager 11 and 12, the speed of operation of the system is increased. Because the map managers are used to control the sensors, the sensitivity, accuracy and reliability of the system can be optimized.

Although the system described above is intended for use in military aircraft, a similar system could be used in non-military aircraft for optimizing the aircraft's route, avoiding collision with other aircraft, avoiding areas of adverse weather condition or the like.

What is claimed is:

1. An aircraft threat monitoring system comprising: a radar sensor unit of a kind that detects the presence and location of an object by reflection from the object of radar signals generated by the radar sensor unit, at least one other sensor unit having a sensor of a different nature from the radar sensor unit responsive to a potential threat external to the aircraft and a processing unit connected to receive an output of the respective sensor, the processing unit deriving a respective inference output signal representative of a potential threat; and map manager means connected to receive each said inference output signal, said map manager means being operative to collate said inference output signals to derive a threat output signal, and said map manager means controlling the sensitivity of the radar sensor unit in response to the output of another of said sensor units, said manager means including first and second map manager means, the first map manager means being operative to run a map management process in respect of the groundspace, and the second map manager means being operative to run a map management process in respect of the airspace.

2. An aircraft threat monitoring system comprising: a radar sensor unit of a kind that detects the presence and location of an object by reflection from the object of radar signals generated by the radar sensor unit, at least one other sensor unit having a sensor of a different nature from the radar sensor unit responsive to a potential threat external to the aircraft and a processing unit connected to receive an output of the respective sensor, the processing unit deriving a respective inference output signal representative of a potential threat; and map manager means connected to receive each said inference output signal, said map manager means being operative to collate said inference output signals to derive a threat output signal, and said map manager means controlling the scan of the radar sensor unit in response to the output of another of said sensor units, said map manager means including first and second map manager means, said first map manager means being operative to run a map management process in respect of the groundspace, and the second map manager means being operative to run a map management process in respect of the airspace.

3. An aircraft threat monitoring system comprising: a radar sensor unit of a kind that detects the presence and location of an object by reflection from the object of radar signals generated by the radar sensor unit, a missile approach warning receiver, a processing unit connected to receive an output of the radar sensor unit and the missile approach warning receiver, the processing unit deriving an inference output signal in respect of potential threats detected by the radar sensor unit and the missile approach warning receiver, and map manager means connected to receive each said inference output signal, said map manager means collating said inference output signals to derive a threat output signal, and said map manager means being operative to change the frequency of transmission of the radar sensor unit in response to detection of a missile in order to reduce the ability of the missile to home on the aircraft, said map manager means including first and second map manager means, the first map manager means being operative to run a map management process in respect of the groundspace, and the second map manager means being operative to run a map management process in respect of the airspace.

4. An aircraft threat monitoring system comprising: an electro-optic sensor responsive to electromagnetic radiation incident on the aircraft, at least one other sensor unit having a sensor of a different nature from said electro-optic sensor responsive to a potential threat external to the aircraft and a processing unit connected to receive an output of the respective sensor, the processing unit deriving a respective inference output signal representative of a potential threat; and map manager means connected to receive each said inference output signal, said map manager means being operative to collate said inference output signals to derive a threat output signal, and said map manager means controlling the frequency of radiation monitored by the electro-optic sensor in accordance with said threat output signal, said map manager means including first and second map manager means, the first map manager means being operative to run a map management process in respect of the groundspace, and the second map manager means being operative to run a map management process in respect of the airspace.

5. A system according to claim 1, wherein the map manager means controls the radar sensor unit to modify its scan in accordance with the output from one of the other sensor units.

6. A system according to claims 1 or 2 wherein one of said sensor units includes a missile approach warning receiver.

7. A system according to claims 1 or 2 wherein one of said other sensor units includes a radar warning receiver responsive to radar emission external of the aircraft.

8. A system according to claims 1 or 2 wherein one of said other sensor units includes a forward-looking infrared detector that provides infrared image information in respect of ground in front of the aircraft.

9. A system according to one of claims 1, 2, 3 or 4, wherein the processing unit of at least one of the other sensor units supplies inference output signals to both the first and second map manager means.

10. An aircraft threat monitoring system comprising: a radar sensor unit of a kind that detects the presence and location of an object by reflection from the object of radar signals generated by the radar sensor unit, at least one other sensor unit having a sensor of a different nature from the radar sensor unit responsive to a potential threat external to the aircraft and a processing unit connected to receive an output of the respective sensor, the processing unit deriving a respective inference output signal representative of a potential threat; map manager means connected to receive each said inference output signal, said map manager means being operative to collate said inference output signals to derive a threat output signal, and said map manager means controlling the sensitivity of the radar sensor unit in response to the output of another of said sensor units; and planner means which has stored therein route information of the aircraft from take-off to destination and information as to the allocation of aircraft weapons, the said map manager means being operative to supply information to the planner means during flight of the aircraft to update the information stored therein.

11. An aircraft threat monitoring system comprising: a radar sensor unit of a kind that detects the presence and location of an object by reflection from the object of radar signals generated by the radar sensor unit, at least one other sensor unit having a sensor of a different nature from the radar sensor unit responsive to a potential threat external to the aircraft and a processing unit connected to receive an output of the respective sensor, the processing unit deriving a respective inference output signal representative of a potential threat; map manager means connected to receive each said inference output signal, said map manager means being operative to collate said inference output signals to derive a threat output signal, and said map manager means controlling the scan of the radar sensor unit in response to the output of another of said sensor units; and planner means which has stored therein route information of the aircraft from take-off to destination and information as to the allocation of aircraft weapons, the said map manager means being operative to supply information to the planner means during flight of the aircraft to update the information stored therein.

12. An aircraft threat monitoring system comprising: a radar sensor unit of a kind that detects the presence and location of an object by reflection from the object of radar signals generated by the radar sensor unit, a missile approach warning receiver; a processing unit connected to receive an output of the radar sensor unit and the missile approach warning receiver, the processing unit deriving an inference output signal in respect of potential threats detected by the radar sensor unit and the missile approach warning receiver; map manager means connected to receive each inference output signal, said map manager means collating said inference output signals to derive a threat output signal, and said map manager means being operative to change the frequency of transmission of the radar sensor unit in response to detection of a missile in order to reduce the ability of the missile to home on the aircraft; and planner means which has stored therein route information of the aircraft from take-off to destination and information as to the allocation of aircraft weapons, the said map manager means being operative to supply information to the planner means during flight of the aircraft to update the information stored therein.

13. An aircraft threat monitoring system comprising: an electro-optic sensor responsive to electromagnetic radiation incident on the aircraft, at least one other sensor having a sensor of a different nature from said electro-optic sensor responsive to a potential threat external to the aircraft and a processing unit connected to receive an output of the respective sensor, the processing unit deriving a respective inference output signal representative of a potential threat; map manager means connected to receive each said inference output signal, said map manager means being operative to collate said inference output signals to derive a threat output signal, and said map manager means controlling the frequency of radiation monitored by the electro-optic sensor in accordance with said threat output signal; and planner means which has stored therein route information of the aircraft from take-off to destination and information as to the allocation of aircraft weapons, the said map manager means being operative to supply information to the planner means during flight of the aircraft to update the information stored therein.

* * * * *